United States Patent [19]

Morstadt

[11] 3,867,585

[45] Feb. 18, 1975

[54] ELECTRONIC TONE RINGER

[75] Inventor: Richard A. Morstadt, Elmhurst, Ill.

[73] Assignee: GTE Automatic Electric Laboratories Incorporated, Northlake, Ill.

[22] Filed: Aug. 2, 1973

[21] Appl. No.: 385,134

[52] U.S. Cl. .................................. 179/84 T, 331/47

[51] Int. Cl. ............................................ H04m 1/00

[58] Field of Search ............ 179/84 VF, 84 R, 84 T; 331/47, 108 D

[56] References Cited

UNITED STATES PATENTS

| | | | |
|---|---|---|---|
| 3,466,403 | 9/1969 | Combridge et al | 179/84 T |
| 3,566,254 | 2/1971 | Griffin | 323/22 |
| 3,609,579 | 9/1971 | Chappell et al | 331/46 |
| 3,772,470 | 11/1973 | Cowpland et al | 179/84 T |

*Primary Examiner*—Kathleen H. Claffy
*Assistant Examiner*—Joseph Popek
*Attorney, Agent, or Firm*—Robert J. Black

[57] ABSTRACT

An electronic tone ringer for use in telephone subsets. Operating in response to and powered from incoming received ringing signals, the ringer circuitry provides audible multitone signals. The frequency of the output signals and the shift rate between frequencies are both independent of the incoming ringing signals.

8 Claims, 1 Drawing Figure

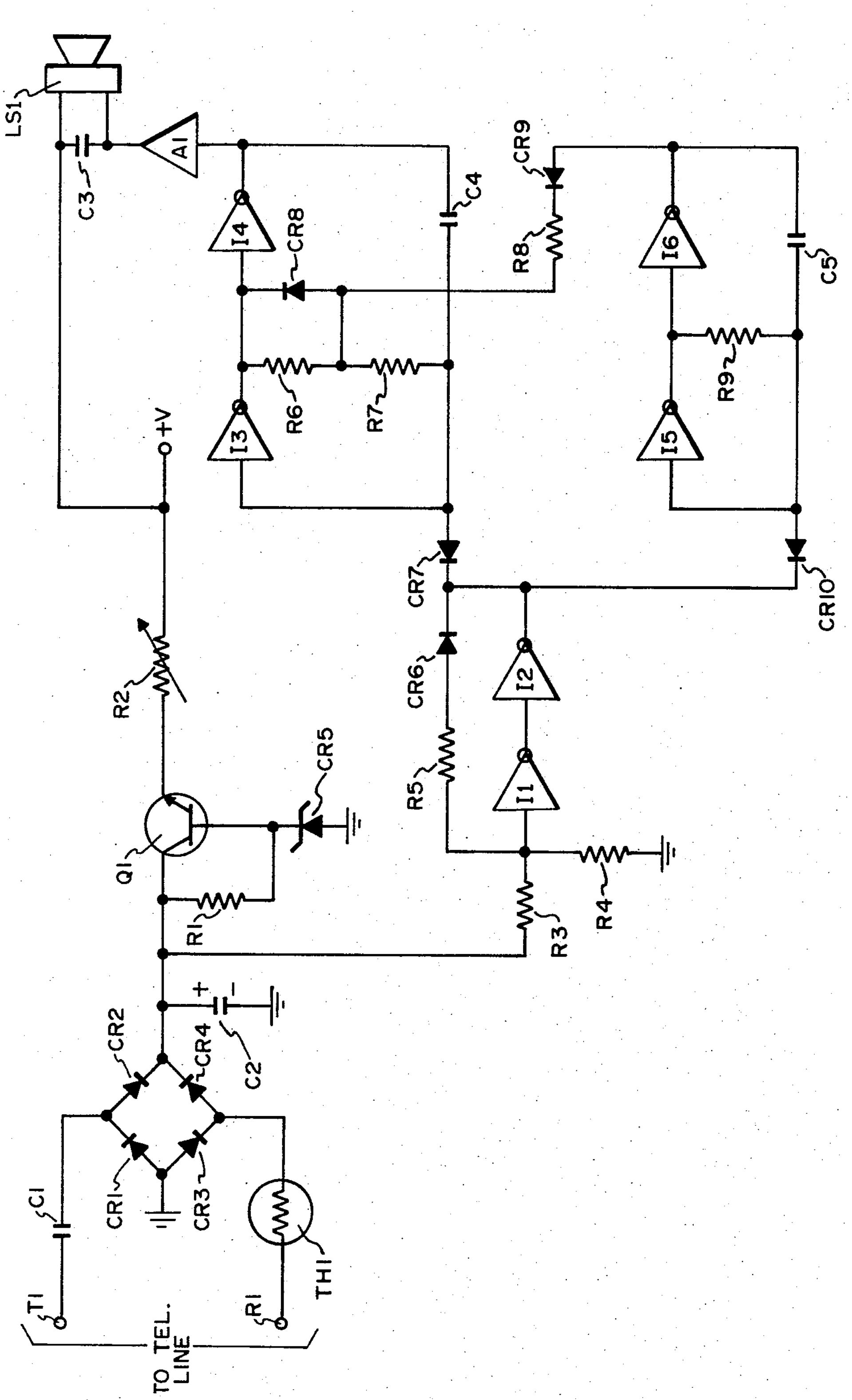
LS1
C3
A1
I4
CR8
C4
CR9
R8
I6
C5
R9
I5
R6
R7
I3
+V
CR7
CR10
CR6
I2
R2
I1
R5
CR5
Q1
R1
R3
R4
CR2
CR4
C2
C1
CR1
CR3
TH1
T1
R1
TO TEL. LINE

ELECTRONIC TONE RINGER

BACKGROUND OF THE INVENTION

1. Field of the Invention

This invention relates to telephone systems and more particularly to a toner ringer for use in a telephone subscriber's subset.

2. Description of the Prior Art

In the past most telephone subset ringers have been of the electromechanical type. These units typically consist of an electromagnet that operates in response to ringing signals received from the telephone central office. In response to these signals a clapper or hammer type of mechanism is caused to periodically make contact with and then release, against a bell or gong type of mechanism. The resulting sound being transmitted to the subscriber to act as a signal that an incoming call is being received. Such electromechanical units are characterized by substantially large size and consequently are difficult to include in present day telephone subsets, which are substantially reduced in size over earlier versions.

Like most mechanical devices electromechanical ringers in continued operation are highly prone to changes in adjustment. Such changes frequently cause changes in tone, volume, etc. rendering the output signal unacceptable to the telephone subscriber. To correct such adjustments service calls are required with the obvious economic disadvantage. Also the output signals of electromechanical ringers are frequently mistaken for similar devices such as doorbells, etc. that are often located in an environment similar to that where a conventional telephone substation is employed.

The characteristic sounds produced by electromechanical ringers contain many high frequency components. Older subscribers may traditionally have a loss of hearing particularly at high frequencies and accordingly they experience considerable difficulty in hearing conventional electromechanical ringers.

More recently ringers of electronic construction have been developed. Some of these units have generated single frequency tone signals which have found a general lack of acceptance in public usage. In attempts to correct this fault in early electronic tone ringers various techniques have been developed for providing multitone signals. An early approach to the problem was to modulate the tone source with the incoming ringing signals, providing a composite signal whose characteristics were determined by a base frequency modulated by the frequency of the alternating current ringing signal received from the central office. Such signals were also found to be essentially unacceptable by telephone subscribers because the ringing frequencies utilized by telephone companies are many and varied. Some of the resultant output signals are not easily recognized as being indicative of incoming telephone calls. Accordingly subscriber acceptance was also poor.

Prior art electronic ringers have also suffered from other problems such as changes in characteristics due to the subscriber's line loop length and the use of multiple ringers on the same telephone line.

Early electronic tone ringers generally proved to be insufficient in output providing less than adequate signal strength. Several different techniques have been employed to correct this obvious defect, including the use of horns, resonators, etc., to acoustically improve the output signal of the tone ringer.

Many prior art electronic tone ringers also suffered from an inability to distinguish from spurious line signals and ringing signals, accordingly producing false tones that were not actually indicative of an incoming call. Accordingly the present invention discloses an electronic ringer characterized by a pleasing tone signal of high volume that is easily recognizable in a wide variety of environments as indicating the presence of an incoming telephone call.

SUMMARY OF THE INVENTION

The electronic telephone ringer of the present invention is powered from ringing signals received over the telephone line from a telephone central office. At the subscriber station the incoming ringing signals are coupled through a capacitor to a full wave bridge rectifier connected across the telephone line. The output of the bridge rectifier is filtered to eliminate excessive ripple by means of a capacitor and then applied to an input of a transistorized series regulator circuit which employs a Zener diode as a reference to produce a known and constant voltage output. This output signal is then utilized to power portions of the associated circuitry of the present telephone ringer. Certain other portions of the present ringer however utilize the unregulated voltage directly from the ripple filter.

The output signals from the power supply are dependent on interrupted ringing signals received from a telephone office and may be considered as successive but distinct and separate bursts of direct current.

Included in the present tone ringer are a transistorized audio oscillator of the R/C type that normally generates a tone signal output at a first frequency. Included however in its frequency determining component structure is a resistor that may be shunted in response to the output of a second oscillator. This combination of two oscillators causes the output of the first oscillator to shift back and forth between two different and distinct audio tones, at a rate determined by the output of the second oscillator. The resultant output signal from the two oscillators in combination is applied to a power amplifier stage whose output is connected to a small dynamic or electromagnetic transducer.

Also included in the present circuitry is a threshold detector circuit which operates after the output of the power supply reaches a predetermined voltage to permit the signals generated by the two oscillators to be applied to the power amplifier output stage. The threshold detector helps to guarantee that spurious incoming signals will not cause operation of the present tone ringer. The threshold detector also guarantees that output signals from the present ringer are stable in characterisic and relatively unaffected by variable ringing voltage and other telephone plant characteristics external to the telephone substation.

BRIEF DESCRIPTION OF THE DRAWING

FIG. 1 is a schematic circuit diagram of an electronic tone ringer for use in a telephone subscriber station in accordance with the present invention.

DESCRIPTION OF THE PREFERRED EMBODIMENT

Referring now to FIG. 1 there is shown in schematic form a tone ringer for use in a telephone subscriber substation in accordance with the present invention. The present ringer device is connected to a subscriber telephone line through the subscriber telephone substation which is not shown inasmuch as it does not form a portion of the present invention.

Incoming signals received over the telephone line are presented to terminals T1 and R1 where they are coupled through coupling capacitor C1 and thermistor TH1 to a full wave rectifier diode bridge consisting of diodes CR1 through CR4 inclusive. Capacitor C1 provides isolation of the present circuitry from any direct current potentials that may exist on the telephone line. Thermistor TH1 isolates the present tone ringer from the transmission circuitry of the associated telephone subset. In this manner normal low level telephone signals such as speech signals, touch calling signals, etc. are not affected by the circuitry of the present tone ringer due to the high impedance presented by thermistor TH1. Positive voltage output is taken from the bridge rectifier at the junction of diodes CR2 and CR4, while negative (circuit ground) is taken from the junction of diodes CR1 and CR3.

Output from the bridge rectifier is connected across capacitor C2 which acts as a filter to eliminate excessive ripple from the output potential derived from the bridge rectifier. Filtered potential is then applied to the collector of transistor Q1 which acts as a series regulator in conjunction with its associated biasing resistor R1 and reference Zener diode CR5. The regulated output potential taken from the emitter of transistor Q1 at terminal +V is connected to the various circuit elements of the present tone ringer. The particular connections of battery and ground have not been shown for the sake of clarity inasmuch as they do not actually form a portion of the present invention.

The basic tone signals generated by the present tone ringer are produced by an oscillator circuit consisting of inverters 13 and 14 and their associated frequency determining components R6, R7 and C4. All of the inverter circuits used in the present invention are conventional in design, thus the detailed circuitry is not shown. Also included in this oscillator are diodes CR8, CR9 and resistor R8 whose function will be described in detail later.

Assuming now that power from terminal +V and ground is connected to inverters I3 and I4 and assuming that diodes CR7 is non-conductive, the circuitry consisting of inverters I3, I4, etc., will oscillate at a rate determined by the frequency determining components outlined above.

During normal operation of the oscillator that includes inverters I3 and I4 the output of inverter 13 is alternately positive and then ground while the output of inverter I4 is alternately ground and then positive. Assuming the output of I3 is positive and the output of I4 is ground, capacitor C4 will be charged from the positive output of I3 through resistors R6 and R7. When the capacitor is sufficiently charged (the voltage at the input to I3 has reached a predetermined level) the output of I3 will switch to ground and the output of I4 will switch positive. Capacitor C4 will then be charged in the opposite direction from the positive output of I4 through R7 and CR8 to the ground reference presented at the output of I3. When C4 is sufficiently charged (the voltage at the input of I3 has fallen to the predetermined threshold) the inverters will switch to their initial states. It should be noted at this point that the period of time that the output of inverter I4 is positive is a function of the values of R7 and C4 while the period of time that I4 is at ground is a function of the values of R6, R7 and C4. In the present embodiment the frequency of operation of the oscillator consisting of inverters I3, I4, etc. is typically fixed in the range of 400 to 2,000 Hz.

The oscillator consisting of inverters I5 and I6 operates in a similar manner except that the time period of both half cycles of operation are determined by the values of R9 and C5. The signal from this oscillator is typically fixed at a frequency in the range from 5 to 40 Hz. The positive voltage portion of this oscillator's signal is taken from the output of inverter I6, coupled through CR9 and R8 and presented to the oscillator consisting of I3 and I4 for the purpose of altering its period of oscillation.

It should be noted that presence of a positive signal at the output of I6 causes a modification of only the half cycle of operation of oscillator I3, I4 that corresponds to a ground level at the output of I4. Under this condition, the time period for this half cycle of operation of oscillator I3, I4 is determined by the values of R6 and R9 in parallel, R7 and C4. There is no modification of the operation of oscillator I3, I4 by oscillator I5, I6 when I3 is at ground (I4 positive) or when I6 is at ground because of the shunting effect of CR8 or the blocking effect of CR9 respectively.

Thus the output signal waveform from the oscillators appears at the output of I4 with fixed positive level line period and a variable ground level time period, altered at the frequency of oscillation of I5, I6. This output signal is amplified by amplifier A1. The output of amplifier A1 is coupled to a miniature loudspeaker or similar transducer for reproducing the tone signals utilized to advise a telephone subscriber of incoming ringing signals being received at the associated telephone subset.

Capacitor C3 connected across the input of transducer LS1 acts to reduce the amplitude of high frequency signals applied to transducer LS1, and acts in conjunction with the inductance of transducer LS1 to accentuate the desired output signals from the oscillators of the present invention.

Potentiometer R2 permits adjustment by the subscriber of the amplitude of the signals reproduced by transducer LS1.

Referring now again to FIG. 1 connected between the positive output of the rectifier bridge and the two oscillators mentioned above is a threshold detector circuit consisting of inverters I1, I2, resistors R3, R4, R5 and diodes CR6, CR7 and CR10. This threshold detector circuitry acts to inhibit the operation of the two oscillators described previously until such time as the voltage output from the rectifier reaches a predetermined level.

Initially prior to that time in which the voltage from the rectifier reaches the predetermined amplitude, the output of inverter I1 is positive and the output of inverter I2 is at ground. With the ground present at the output of inverter 12 the same ground will act to prevent operation through diode CR7 of the oscillator consisting of inverters I3 and I4, etc., and through diodes CR10 the operation of the oscillator consisting of inverters I5, I6, etc.

As the voltage from the rectifier rises, the voltage at the input of inverter I1 is determined by a voltage divider consisting of resistors R4 and R5 in parallel and R3. When the input voltage determined by this voltage divider rises to a predetermined value inverter I1 and consequently inverter I2 will change state, with inverter I1 going to ground and the output of inverter I2 going positive. At this time the positive voltage output from inverter I2 reverse biases diodes CR7 and CR10 allowing the previously described oscillators to go into operation, whereupon they generate the previously described tone signals which are amplified by amplifier A1 and reproduced by transducer LS1.

As the ring signal ceases and the output of the rectifier diminishes, the voltage at the input of inverter I1, which is now determined solely by a voltage divider consisting of resistors R3 and R4 (resistors R5 is no longer included from that time that inverter I2's output went positive), diminishes below the predetermined threshold and inverters I1 and I2 again change states with the output of inverter I1 returning to positive and the output of inverter I2 returning to ground. Accordingly, with the ground signal present at the output of I2 ground is applied through diodes CR7 and CR10 to the two oscillators in the manner previously described, rendering them inoperative.

While but a single embodiment of the present invention has been shown, it will be obvious to those skilled in the art that numerous modifications may be made without departing from the spirit and scope of the present invention which shall be limited solely by the claims appended hereto.

What is claimed is:

1. A tone ringer for use in a telephone subset connected to a telephone line, comprising: a rectifier circuit connected to said telephone line, operated in response to ringing signals received over said telephone line, to convert said ringing signals to direct current potential; a first oscillator circuit connected to said rectifier, and including a plurality of frequency determining components, operated in response to said d.c. potential from said rectifier to generate tone signals at a first frequency; a second oscillator circuit connected to said rectifier circuit and including a circuit connection to said first oscillator circuit, operated in response to said d.c. potential from said rectifier to periodically shunt at least one of said plurality of frequency determining components in said first oscillator; said first oscillator further operated in response to each shunting of at least one of said frequency determining components, to generate a tone at a second frequency; and a transducer connected to said first oscillator operated in response to generation by said first oscillator of tones of said first and second frequencies to audibly reproduce said tones.

2. A tone ringer as claimed in claim 1 wherein: there is further included a threshold detector connected between said rectifier and said first and second oscillators; operated in response to said d.c. potential from said rectifier being less than a predetermined value to inhibit the operation of said oscillators.

3. A tone ringer as claimed in claim 2 wherein: said threshold detector is further operated in response to said d.c. potential from said rectifier being of at least a predetermined value to permit operation of said oscillators.

4. A tone ringer as claimed in claim 1 wherein: there is further included an amplifier circuit connected between said first oscillator and said transducer, operated to amplify said tones of said first and second frequencies.

5. A tone ringer as claimed in claim 4 wherein: there is further included a regulator circuit connected to a junction between said rectifier circuit and said first oscillator and said second oscillator, said regulator operated to maintain the magnitude of said d.c. potential at a constant level.

6. A tone ringer as claimed in claim 5 wherein: said amplifier and transducer are connected to said regulator, and in response to said constant magnitude d.c. potential said amplifier and transducer are operated to amplify and reproduce said signals at a constant maximum amplitude.

7. A tone ringer as claimed in claim 5 wherein: there is further included a potentiometer connected to said regulator circuit, manually adjustable to control the level of magnitude of said d.c. potential.

8. A tone ringer as claimed in claim 1 wherein: there is further included a capacitor connected in parallel with said transducer, operated in combination with said transducer to accentuate said signals reproduced by said transducer.

* * * * *